United States Patent [19]

Takahashi

[11] Patent Number: 4,715,804
[45] Date of Patent: Dec. 29, 1987

[54] METAL MOLD FOR RESIN MOLDING
[75] Inventor: Mitsuo Takahashi, Matsudo, Japan
[73] Assignees: Seikoh Giken Co., Ltd., Chiba; Sumitomo Heavy Industries, Ltd., Tokyo, both of Japan
[21] Appl. No.: 852,339
[22] Filed: Apr. 15, 1986
[30] Foreign Application Priority Data
    Apr. 19, 1985 [JP] Japan .................... 60-84056
[51] Int. Cl.⁴ .................... B29C 45/08; B29C 45/67
[52] U.S. Cl. .................... 425/141; 264/328.11;
            425/150; 425/451.2; 425/589; 425/810
[58] Field of Search .................... 264/328.7, 328.11;
        425/141, 149, 150, 451.2, 555, 574, 575, 590,
                                            595, 589, 810

[56] References Cited
        U.S. PATENT DOCUMENTS
    4,519,763  5/1985  Matsuda et al. .................... 425/451.2

FOREIGN PATENT DOCUMENTS
    167134  10/1983  Japan .................... 425/589

Primary Examiner—Jay H. Woo
Assistant Examiner—Timothy W. Heitbrink
Attorney, Agent, or Firm—Spencer & Frank

[57] ABSTRACT

A metal mold for resin molding of the type which comprises the combination of a fixed side metal mold assembly and a movable side metal mold assembly. Melt resin material is supplied into and filled in a cavity formed between the fixed side metal mold assembly and the movable side metal mold assembly, and pressure applied to obtain a desired mold thickness of a disk, etc. The metal mold for resin molding according to this invention further includes a spacer inserted between the ends of the guide post rods and the movable side metal mold assembly, to define a gap for adjusting the metal mold thickness.

2 Claims, 4 Drawing Figures

METAL MOLD FOR RESIN MOLDING

BACKGROUND OF THE INVENTION

The present invention relates to a metal mold for resin molding which can mold a resin compact of uniform molding density, and more particularly to a metal mold for resin molding which can mechanically define a precise pressing mold gap by using guide post rods.

As a disk type information recording media, optical audio, and video and magnetooptics discs are known.

FIG. 1 is a sectional view of an example of such a disk type information recording medium.

Such disk type information recording media are made of transparent resin material of good light transmittivity and at the center of the disk there is formed an opening 1 with which the disk is mounted on a revolving shaft. The upper surface 2 of such disk type information recording media is finished to a mirror face having a surface coarseness within 0.01~0.02 micron meter, and extremely minute rugged pits for recording information are formed concentrically at the lower surface 3 thereof.

In the case of optical audio and video disks, laser spot light is irradiated downwardly from that upper surface 2 while rotating the disk, and the changes of light reflected by the rugged pits formed at the rear side 3 of the disk are taken out to read information. In the case of the magnetooptics disk, specific magnetic material is coated on both the upper and rear surfaces of the disk, the magnetic material being able to generate changes of phase in response to the laser spot light energy. The recording and erasing of information may therefore likewise be performed.

In the magnetooptics disk, high reliability of information is required, compared with that required in the optical audio disk or video disk. For example, as a standard of reliability, an example of the precision in the double refraction rate is now explained. In general, in the optical audio disk, an error of ±50 nm is allowable, while in the case of the magnetooptics disk, a precision within ±5 nm is required.

In order to improve the preciseness of the double refraction rate when manufacturing the magnetooptics disk by the injection molding of the transparent resin material, a method of improving the evenness of the molding density of a disk has been proposed.

FIG. 2 is a view for explaining the method for improving the molding density of the resin mold compact. In the figure, the final disk thickness to be obtained is given by t, as shown in the right-hand portion of the figure. At the time of injection for filling the resin material; the thickness of the cavity is first held at t1 made somewhat larger than t, and the resin material is injected with relatively low injection pressure and filled into the cavity space, as shown in the left-hand portion of FIG. 2. Then pressure is applied thereto for molding so as to obtain the final thickness t of the disk, as shown in the right-hand portion of FIG. 2.

FIG. 3 is a sectional view of an example of a conventional metal mold for resin molding, which may be press molded, left-hand portion of the figure representing the state of injection for filling the material and the right-hand portion representing the state where pressure is applied thereto.

In FIG. 3, the reference numeral 4 indicates a fixed plate, 5 a nozzle, 6 a movable plate, 7 a fixed metal mold plate, 8 guide post rods, 9 a passage for feeding the resin material and 10 a fixed side cavity plate. 11 is a stepped flat surface formed on the fixed side cavity plate 10, 12 a movable metal mold plate, 13 bores for guiding the guide post rods 8, 14 a movable side cavity plate and 15 an end flat surface of the movable side cavity plate 14.

The fixed plate 4 forms a part of an injection molding machine and is fixed to its body. The nozzle 5 is for injecting through it the melt resin material into the cavity and is movable axially. The fixed metal mold plate 7 is mounted to the fixed plate 4, and the guide post rods 8 are mounted to the plate 7. At the center of the plate 7 is mounted the passage 9 through which the melt resin material passes. At the outer periphery of the fixed side cavity plate 10 is formed the stepped flat surface 11. The fixed side cavity plate 10 is integrally mounted to the fixed metal plate 7 which is fixed to the fixed plate 4, and so these portions form a fixed side metal mold assembly.

The movable plate 6 moves in the axial direction to press and open the mold. The movable metal mold plate 12 is fixed on the movable plate 6, and in the plate 12 is formed the guide bores 13 for guiding the guide post rods 8. The movable side cavity plate 14 is integrally mounted to the movable side metal mold plate 14, and mates with the fixed side cavity plate 10 at the respective complementary peripheral surfaces of the plates 14 and 10. When the end surface 15 of the movable side cavity plate 14 fits pressedly with the stepped surface 11 of the cavity plate 10, a cavity space is formed to mold the compact whose thickness is t, corresponding to the final thickness of the pressed molding compact. The movable side cavity plate 14 is integrally mounted to the movable metal mold plate 12 which on the other hand is fixed to the movable plate 6, all of these elements forming a movable side metal mold assembly.

The press molding operation of the conventional resin molding metal mold shown in FIG. 3 is explained.

The movable plate 12 is at first opened and stopped for the press molding gap of t1-t, while an adequate pressing power is applied thereto so that it does not retreat any further even though subjected to the injection pressure. Melt resin material is then injected through the passage 9 to fill the cavity and obtain a compact, as shown in the left-hand portion of FIG. 3. The holding state of the movable metal mold is now released and the movable metal mold plate 12 is pressed and moved until the stepped surface 11 of the fixed side cavity plate 10 and the peripheral end surface 15 of the movable side cavity plate 14 are in contact with each other. Thus a compact of the final thickness t may be molded by applying pressure, as shown in the right-hand portion of FIG. 3.

In the case of the magnetooptics disk and other optical disks, the desired thickness t of the disk is 1.2 mm and the maximum press molding gap must be 10% or less of this thickness of the disk. In other words, for obtaining a gap of 0.12 mm or smaller thickness, the temporary holding position of the movable metal mold plate 12 must precisely be adjusted in the cavity plate for injection molding. Such requirements can not be satisfied when the articles are manufactured under a mass production basis. Further, even if the evenness in each compact may be improved, the evenness of the compacts on a large amount of compacts as in a lot can not be assured.

The shape and form of the compact itself is rather simple, but the requirements of the metal mold for the various information recording disks are very high. Further, various circuits, such the as cooling water circuit, hydraulic circuit, pneumatic circuit, vacuum suction circuit, pressure sensor, temperature sensor, signal stamper removable device, etc. are mounted to the metal mold. For this reason, there are many connecting portions between the metal mold and the body of the molding machine and portions thereof. For example, in the case of a metal mold for a magnetooptics disk of 130 mm in diameter, there are 32 such portions, and so the side surface of the metal mold are almost covered with these many portions. For this reason, it is not possible in such a metal mold to add the mechanics for adjusting the molding gap, which therefore requires mounting the metal mold to an unnecessarily larger apparatus for giving the function to the mold.

An object of this invention is therefore to provide a small sized resin molding metal mold, which can rather simply and mechanically adjust the press molding gap for a disk to be formed.

SUMMARY OF THE INVENTION

The metal mold for resin molding according to this invention is of the type which comprises a fixed side metal mold assembly and a movable side metal mold assembly. The fixed side metal mold assembly includes a fixed side metal mold plate; a fixed side cavity plate mounted to the fixed side metal mold and having a peripheral stepped flat surface; and guide post rods provided on the fixed side metal mold plate. The movable side metal mold assembly includes a movable side metal mold plate in which bores are provided for guiding the guide post rods therethrough and a movable side cavity plate which is mounted to the movable side metal mold plate and mates with the complementary stepped surface of the fixed side cavity plate to provide a cavity space of a determined thickness therebetween corresponding to the mold thickness. The metal mold for resin molding of this invention further comprises a pressure receiving plate contacting with the movable side metal mold and having therein a hydraulic device for operating the movable side metal mold and a spacer inserted between the ends of the respective guide post rods and the pressure receiving plate and defining the press mold gap for forming the disk mold, so that after the spacer is inserted to temporarily hold the pressure receiving plate for the length corresponding to the determined press molding gap, and the resin material is injected and when the movable side cavity plate is moved to press the material, pressure is applied by the hydraulic device until the mating complementary surface of the movable side davity plate is pushed and stopped.

DESCRIPTION OF THE PREFERRED EMBODIMENT

Figure 4:
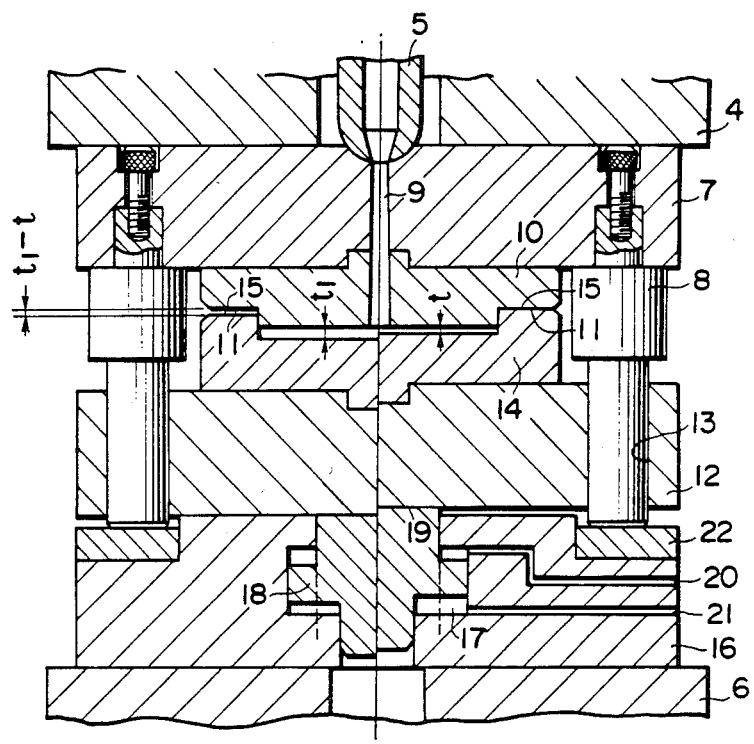
FIG. 4 is a sectional view of an embodiment of the metal mold for resin molding according to the invention.

The preferred embodiment of the metal mold for resin molding according to the present invention, which is formed by press molding is explained hereunder with reference to FIG. 4, which represents a sectional view of the embodiment of the metal mold according to the present invention.

Figure 1:
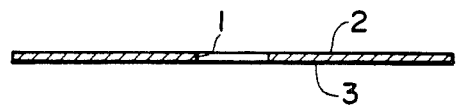
FIG. 1 is a sectional view of an example of the conventional disk type information recording media.
Figure 2:
FIG. 2 is a view for explaining a method for improving the molding density of the resin mold compact.
Figure 3:
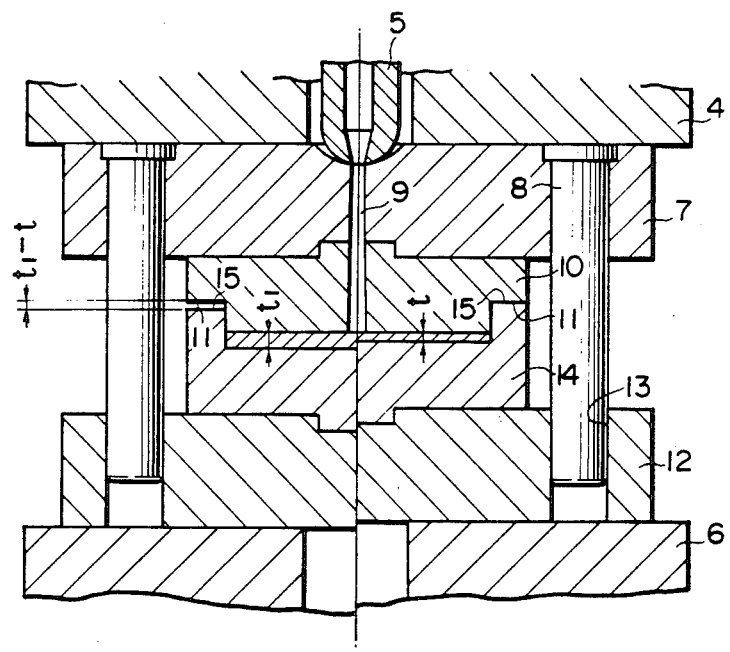
FIG. 3 is a sectional view of an example of a conventional metal mold for resin molding.

In the figure, the portion shown in the left-hand portion is the state of injection and filling for molding and in the right-hand portion the state where the pressure is applied for obtaining the mold compact. In the following explanation, the elements whose functions identical with or similar to those of the conventional metal mold explained with reference to FIG. 3 will be explained using the same reference numerals used therein.

Fixed plate 4 forms a part of the injection molding machine and is fixed to the body of the molding machine. A nozzle 5 injects the melt resin material into a cavity of the mold and can be moved in its axial direction. A fixed metal mold plate 7 is mounted to the fixed plate 4, and to this fixed metal mold plate 7 are mounted guide post rods 8. At the center of the fixed metal mold plate 7 is provided a passage 9 through which the melt resin material passes. At the periphery of a fixed side cavity plate 10 is formed a stepped plate surface 11. Since the fixed side cavity plate 10 is integral with the fixed side metal mold plate 7 fixed to the fixed plate 4, these elements forms as a whole a fixed side metal mold assembly.

A movable plate 6 moves in its axial direction to press and open the mold plates. A movable metal mold plate 12 is mounted to the movable plate 6 and guide bores 13 are provided therein for guiding guide post rods 8. A movable side lower cavity plate 14 is integrally mounted to the movable side metal mold plate 12, and at the periphery thereof is formed a stepped flat surface 15 to mate complementarily with the peripheral flat surface of the fixed side cavity plate 10. A cavity is formed whose thickness is set to t when the stepped surface 15 of the movable side cavity plate 14 pressedly fits with the stepped surface 11 of the fixed side cavity plate 10.

According to the present invention, there are included in the metal mold, a pressure receiving plate 16, a hydraulic cylinder 17, a hydraulic piston 18, ports 20 and 21 for supplying hydraulic pressure, a spacer 22, etc. The movable side cavity plate 14, movable side metal mold plate 12, movable plate 6 and pressure receiving plate 16 form a movable side metal mold assembly. The hydraulic cylinder 17 and hydraulic piston 18 form a hydraulic device.

The pressure receiving plate 16 is mounted and fixed to the movable plate 6 and at the center thereof is contained the hydraulic device for press molding, which comprises the hydraulic cylinder 17, hydraulic piston 18, etc. Within the hydraulic cylinder 17 is inserted the hydraulic piston 18, which is connected with the movable metal mold plate 12 at its upper surface 19. The pressure receiving plate 16 has hydraulic pressure supplying ports 20 and 21. The spacer 22 is to press the end portions of the guid post rods 8 and also adjust the press molding gap.

Even if the rigidity of the guide post rods 8 may be made greater when manufactured, the elastic compression deflection appearing in the axial direction can not be made zero, when pressure is applied thereto. For this reason, the pressing gap t1–t may better be obtained beforehand by experiments or calculation. The spacer 22 is selected from among those of various thickness, for obtaining the gap t1-t.

The operation of the metal mold for resin molding according to the present invention will be explained.

After closing the mold plates, the melt resin material supplied from the nozzle 5 passes through the passage 9 and is injected to fill the cavity space, as shown by the left-hand portion of FIG. 4.

At this stage, hydraulic pressure is being applied to the upper portion of the hydraulic cylinder 17 through the hydraulic pressure supplying port 20, by which the movable metal mold plate 12 is lowered downwardly and stops when in contact with the upper surface of the pressure receiving plate 16. At this state, the end portions of the guide post rods 8 are made to press fit with the upper surfaces of the respective spacers 22. Since the length of the guide post rods 8 and the thickness of the spacers 22 is already set so as to have the press molding gap t1-t, the injection of the resin material to fill the cavity space for molding is performed.

Now, hydraulic pressure is supplied to the lower portion of the hydraulic cylinder 17 through the hydraulic pressure supplying port 21. The movable side cavity plate 14 fixed to the movable metal mold plate 12 is pressedly moved until its outer peripheral surface 15 fits with the peripheral flat surface 11 of the fixed side cavity plate 10. By this movement, molding is made by pressing and the final disk thickness t may be obtained.

As explained above, according to the present invention, the pressing mold gap may mechanically and precisely be adjusted by means of the guide post rods. Further, the desired thickness of the mold after being pressed may be adjusted extremely precisely together with the flatness of the final disk by the press fit between the stepped flat surfaces of the respective cavity plates. Thus the evenness of the molding density of each compact may be improved. Not only this but, at the time of manufacturing on a mass-production basis, errors among the articles in a lot or between lots may be made as small as possible.

Adjustment of the press mold gap using the guide post rods is thus very useful. Taking the case of the metal mold for the magnetooptics disk of 130 mm in diameter, the size of the flat plane of the metal mold according to the present invention is 30 cm×35 cm and the height is nearly 40 cm. The weight thereof is 270~300 Kg. On the other hand, in the case of the conventional metal mold including additionally an adapter which is able to give the function of adjusting the press molding gap, the size of its flat plane would be 40 cm×45 cm and its height would be nearly 50 cm. Its weight would probably be 600~650 Kg.

To make the metal mold large in size, as in the conventional case, adding an adapter is disadvantageous with respect to economy, operational efficiency and reliability for preciseness. For example, the larger sized metal mold must be mounted only to a molding machine of larger size and with a relatively great pressing power. According to the present invention, the guide post rods 8 are advantageously used for constituting a metal mold which is as small and light as possible.

What is claimed is:

1. A metal mold for resin molding, said mold having a substantially longitudinal axis, comprising a fixed side metal mold assembly including
      a fixed side metal mold plate having a lower surface extending transverse to said longitudinal axis; and
      a fixed side upper cavity plate having an upper surface secured to the lower surface of said fixed side metal mold plate and a lower surface which includes a peripheral stepped flat portion;
   a plurality of guide post rods attached to and projecting, in the direction of said longitudinal axis, from the lower surface of said fixed side metal mold plate, said guide post rods having ends located at a predetermined distance from the lower surface of said fixed side metal mold plate;
   a movable side metal mold assembly including
      a pressure receiving plate having an upper surface extending transverse to said longitudinal axis, the upper surface of said pressure receiving plate being in contact with the ends of said guide post rods;
      a movable side metal mold plate having lower and upper surfaces, the lower surface thereof being supportable by the upper surface of said pressure receiving plate, said movable side metal mold plate being guided for movement in the direction of said longitudinal axis by said guide post rods; and
      a movable side lower cavity plate having a lower surface secured to the upper surface of said movable side metal mold plate and an upper surface which includes a peripheral stepped flat portion, the peripheral stepped flat portion of the upper surface of said lower cavity plate being complementary to and cooperating with the peripheral stepped flat portion of the lower surface of said upper cavity plate, an injection cavity being defined between the lower and upper surfaces of said upper and lower cavity plates respectively;
   means for injecting resin material into said injection cavity;
   a hydraulic device secured to the lower surface of said movable side metal mold plate; and
   means for applying pressure to said hydraulic device during injection of resin material into said cavity to bring the lower surface of said movable side metal mold plate into contact with the upper surface of said pressure receiving plate thereby making the thickness of the gap in said injection cavity equal to a first thickness, said means further applying pressure to said hydraulic device after resin material has been injected into said cavity to bring the complementary peripheral stepped flat surfaces of said upper and lower cavities into contact with each other thereby making the thickness of the gap in said injection cavity equal to a second thickness, wherein said first thickness is greater than said second thickness, the first thickness of said gap of said injection cavity being determined by the length of said guide post rods.

2. A metal mold for resin molding according to claim 1, wherein spacers are interposed berween the projecting ends of said guide post rods and said pressure receiving plate, the thicknesses of said spacers being selected to permit adjustment of the length of the gap of said injection cavity.

* * * * *